Patented Nov. 21, 1933

1,936,563

UNITED STATES PATENT OFFICE 1,936,563

CATALYST

Maurice E. Barker, Edgewood, Md.

No Drawing. Original application September 5, 1928, Serial No. 304,162. Divided and this application August 25, 1931. Serial No. 559,326

5 Claims. (Cl. 23—233)

(Granted under the act of March 3, 1883, as amended April 30, 1928; 370 O. G. 757)

This invention described herein may be manufactured and used by or for the Government for Governmental purposes without the payment to me of any royalty thereon.

This is a division of my application, Serial No. 304,162, filed September 5, 1928, for catalysts and method of preparation.

My invention relates to catalysts, and more particularly to a method of preparing metals and metallic compounds in the form of intimate mixtures suitable for use as catalytic agents, and the products produced according to said method.

It has been found that many chemical reactions are accelerated by the presence of certain substances, known in the science of chemistry as catalyzers. In most cases the chemical reactions are still further accelerated by the presence of certain additional substances. These additional substances that affect the reaction are known as promoters. Thus, when a mixture of two or more substances is utilized as a catalytic agent to affect the speed of a reaction, one or more of the substances may be the catalyst and one or more of the substances may be the promoter. Regardless of the particular role each substance plays in accelerating the reaction, it has nevertheless been found that most reactions are catalyzed more efficiently by a mixture of substances than by a single substance.

It is known that better catalytic effects are obtained when the two or more substances acting as the catalytic agent are intimately mixed. Heretofore, many attempts have been made to secure intimate mixtures of the substances effective as catalysts, but the attempts, while in some instances producing somewhat satisfactory products, have been costly, resulting in a high cost of the catalyst.

At the present time it is the general practice to mix several metallic salts, such as the nitrates of several metals, and calcine the mixture to form a mixture of the oxides. If it is desired to provide a metallic catalyst, the oxides may be reduced. This method, although satisfactory for certain purposes, is not a complete success, as the resulting mixture is not as intimate as is possible to obtain, but is composed of small particles or crystals of the several substances.

An object of my invention is to provide a catalytic agent that will accelerate chemical reactions to a high degree.

Another object of my invention is to provide catalytic material composed of an intimate mixture of several substances.

Another object of my invention is to provide catalytic material formed of a plurality of substances in a very active condition.

Still another object of my invention is to devise a method of preparing catalytic material that will result in the production of a very intimate mixture of the several substances.

With these and other objects in view which may be incident to my improvements, the invention consists in the product and method of preparing the same to be hereinafter set forth and claimed, with the understanding that the several components entering into the composition of the product, and the several steps of the method, may be varied without departing from the spirit and scope of the appended claims.

My invention consists in the provision of catalytic material and the method of preparing the same. According to my invention, the metals to be used either in the metallic state or in the form of metallic compounds are fused together to form an alloy. The alloy is formed because in the same the metals are most intimately mixed. The alloy is then subjected to the action of chemicals to form an intimate mixture of metallic compounds suitable for use as catalytic material. In some instances it is desirable to reduce the metallic compounds to an intimate mixture of the metals which will be in a form particularly desirable for catalytically affecting chemical reaction.

According to my invention it is desirable to secure the most intimate mixture of the components entering into the catalytic material that is possible. A solution of one or more substances in still another substance constitutes a mixture of the components that is extremely intimate and approaches the intimacy of components of a chemical combination.

Alloys that are properly formed exhibit properties similar to those of solutions, and particularly that of the intimacy of the mixture of the components.

Since it is desirable to obtain a product formed of intimately mixed components, an alloy of the metals suitable for catalytic purposes serves as a convenient source from which the catalytic material can be derived. Consequently, my invention comprises the formation of an alloy of several metals and the subsequent treatment of the alloy to produce the catalyst desired.

In carrying out my invention it may be desirable to catalyze a reaction with a mixed catalyst containing iron and copper in a certain ratio. In such a case, an alloy containing iron and copper in the desired ratio would be made up. As the intimacy of the mixture of the components of the catalyst so greatly affects its value as an accelerator for chemical reactions, it is absolutely essential that the components entering into the alloy be completely fused and dispersed into each other so as to form a homogeneous mass.

The alloy may be cast into any desired shape, depending upon the particular use to which it is to be subjected. In many instances it may be desirable to have the catalyst in the form of rods, bars, gratings, or as in my copending application, Serial No. 113,830, filed June 4, 1926, in the form of tubes. In some instances it may be desirable to cast the alloy in various other shapes which are most suitable for the purpose to which the catalyst is to be applied.

After the alloy is cast into a desired form and is set, it is subjected to the action of an oxygenated atmosphere, at a temperature sufficiently high to oxidize its surface. When the surface is oxidized to the desired extent, the oxidation is stopped. The product of this treatment is a mass of material of a desired shape having its surface covered with a porous mixture of the oxides of the several metals in the alloy.

For certain reactions where catalytic material formed of a plurality of mixed oxides is desirable, the treatment just outlined is sufficient. When used for such reactions, the catalytic material, after being poisoned, may be regenerated by subjecting the mass of material to an oxidizing treatment similar to that described in connection with the preparation of the material. A case in which an oxidized alloy similar to that just described and containing copper and iron is desirable is that in which carbon monoxide is converted into carbon dioxide such as described in my copending application Serial No. 113,830, filed June 4, 1926.

An oxidized alloy of iron and copper has been found to effect the conversion of carbon monoxide into carbon dioxide at relatively low temperatures. The same mixture of oxides was found to catalytically accelerate many other reactions, such as the oxidation of sulphur to sulphur dioxide and the oxidation of sulphur dioxide to sulphur trioxide which when absorbed in water produces sulphuric acid. Manganese may be added to either or both of the metals referred to above to form catalysts having similar effects on the oxidation of carbon and sulphur oxides into higher oxides.

In many instances it is desirable to have as a catalyst a mixture of metals in the form of a porous spongy mass. When such a catalyst is desirable, an alloy of the desired composition is made up and cast in the preferred shape. It is then oxidized into a condition such that all exposed surfaces are covered with a coating of the porous mixture of the oxides of the several metallic constituents.

After the oxidation is complete to the extent desired, the oxidized mass is subjected to the action of a reducing medium which removes the oxygen from the porous oxide coating and leaves the surface of the alloyed body in the form of a porous spongy mass. This porous spongy mass of a mixture of several metals is particularly desirable for use as an accelerating catalyst in certain reactions.

Another method of preparing either a mixture of oxides or a spongy mixture of metals is to form a mixture of chemical compounds with the metals of the alloy. This can be accomplished by treating the alloy with chlorine gas, or hydrochloric acid, to form chlorides, with nitric acid to form nitrates, or with other acids to form mixed salts of the respective acids or salt forming substances. The salts or compounds formed can then be calcined into the mixed oxides of the metallic component of the alloys to be used as a mixed oxide catalyst, or if desired the oxides can be reduced to form the porous spongy metallic coating on the cast bodies similar to that previously described.

In either of the methods so far described, the alloy is cast into a form or body on which the catalytic material is formed. By so producing the catalyst, the latter is securely held on the cast body as a base, in a manner such that it will be well exposed to the reaction it is to effect. After the catalyst is poisoned, either the oxide or the spongy metal mass may be reformed by subjecting the body to either the oxidation or the oxidation and reduction treatment previously described. If necessary, the poisoned catalytic material can be scraped or otherwise removed from the surface of the cast alloy and the latter subjected to the necessary action to reform a catalytic surface of the desired type.

A modification of the method of preparing catalysts according to my invention is to first form an alloy of the desired metals and then grind the alloy to either a fine powder or a granular form. For some reactions the powdered or granulated alloy will be sufficient. In other cases, however, it is necessary to oxidize the alloy. The oxidation can be effected by treating the prepared alloy with oxygen as previously described. The oxidation may also be effected by first forming a mixed metallic compound by treating the prepared alloy with certain chemicals, and then calcining the mixed compounds to form the oxides.

When it is desired to prepare the powdered or granulated alloy in the spongy metallic form, the oxide is reduced by a treatment similar to that described in connection with the catalysts formed on the alloyed bodies as a base.

In some instances where compounds are formed with the metals of the alloy, the compound can be reduced directly to the spongy metallic form without the necessity of first converting to the mixture of oxides.

My invention may be applied to the utilization of any of the metals desired for catalytic purposes that will unite with other metals to form alloys. An alloy containing manganese, lead and copper when treated was found to have properties desirable as catalyst. In this particular instance, the alloy was of the following composition:

| | Per cent |
|---|---|
| Manganese | 25 |
| Lead | 10 |
| Copper | 65 |

Alloys of the following composition were also found to possess catalytic properties after treatment:

| | Per cent |
|---|---|
| Manganese | 25 |
| Copper | 75 |

| | Per cent |
|---|---|
| Iron | 90 |
| Copper | 10 |

Alloys containing manganese and iron are effective catalysts when treated according to my invention. Desirable catalytic effects can also be obtained by treating alloys having the components given in the three alloys tabulated above in varying proportions.

In the application of my invention to the catalysis of chemical reactions, it is necessary merely to form an alloy of the desired metals and subject the alloy to any one of several treatments to obtain the material in the preferred form. Thus, if it is desired to produce catalytic material composed of a mixture of oxides, the alloy is cast into certain preferred shapes and the shapes are then subjected to chemical treatment, such as oxidation, by subjecting the shapes to an oxygen treatment.

The cast alloy may be subjected to treatment with chemicals to form a mixture of metallic compounds which may be calcined to the oxide. When the spongy metallic form of catalyst is desired, the oxides are reduced by suitable reducing treatments.

If preferred, the alloy may be ground to various-sized particles and then subjected to any of the treatments outlined above.

Thus it can be seen that my invention provides for the production of catalytic material formed of several substances, in a mixture approaching the intimacy of the constituents of a chemical compound.

My invention also provides for a support or base on which the catalytic material is formed, and utilized. Thus, the alloy is cast into various desired forms which serve as the base for the formation of the catalyst. When catalysts are formed on a base according to my invention, and the catalyst is poisoned, it may be scraped or otherwise removed from the base material and the latter, which consists of the alloy, may be retreated. With such an arrangement, the cost of the catalyst can be reduced and its effectiveness increased, resulting in economical and efficient methods of catalyzing chemical reactions.

Although I have described the preferred embodiments of my invention, I wish it to be understood that I do not confine myself to the precise details of compounding herein set forth, by way of illustration, as it is apparent that many changes and variations may be made therein, by those skilled in the art, without departing from the spirit of the invention, or exceeding the scope of the appended claims.

I claim:

1. A catalyst comprising a base portion formed of an alloy containing copper, iron and manganese, said base portion having intimately formed on the surfaces thereof, a mixture of metallic salts formed by subjecting the alloy to an acid treatment.

2. A catalyst comprising a base portion formed of an alloy containing copper, iron and manganese, said base portion having intimately formed on the surfaces thereof an intimate mixture of metallic compounds formed by subjecting the alloy to a chlorinating agent.

3. A catalyst comprising a base portion formed of an alloy containing copper, iron and manganese, said base portion having intimately formed on the surfaces thereof an intimate mixture of metallic compounds formed by subjecting the alloy to a nitrating agent.

4. A process of producing a catalyst comprising the steps of forming an alloy of the desired catalytic metals, treating the alloys so formed with a suitable chemical to form mixed salts or salt forming substances on the surface thereof, and calcining the substances so formed to obtain the mixed oxides of the metallic components of the alloys attached to the surface thereof.

5. A process of producing a catalyst comprising the steps of forming an alloy of copper, iron and manganese, treating the alloys so formed with an acid to form mixed salts or salt forming substances on the surface thereof, and calcining the substances so formed to obtain the mixed oxides of the metallic components of the alloy attached to the surface thereof.

MAURICE E. BARKER.